(12) United States Patent
Kim et al.

(10) Patent No.: US 9,834,445 B2
(45) Date of Patent: Dec. 5, 2017

(54) POROUS GRAPHENE MEMBER, METHOD FOR MANUFACTURING SAME, AND APPARATUS FOR MANUFACTURING SAME USING THE METHOD

(71) Applicant: KOREA INSTITUTE OF ENERGY RESEARCH, Daejeon (KR)

(72) Inventors: Hee-Yeon Kim, Daejeon (KR); Guk-Hyeon Kwon, Andong-si (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 0 days.

(21) Appl. No.: 14/953,965

(22) Filed: Nov. 30, 2015

(65) Prior Publication Data
US 2017/0152146 A1 Jun. 1, 2017

(51) Int. Cl.
*C01B 31/04* (2006.01)
*B01J 19/24* (2006.01)
*C01B 32/186* (2017.01)

(52) U.S. Cl.
CPC .......... *C01B 31/0453* (2013.01); *B01J 19/247* (2013.01); *C01B 32/186* (2017.08); *C01B 2204/02* (2013.01); *C01B 2204/26* (2013.01)

(58) Field of Classification Search
CPC ................................................. C01B 31/0453
See application file for complete search history.

(56) References Cited

U.S. PATENT DOCUMENTS 5,945,162 A * 8/1999 Senateur ............... B01D 1/18
118/725
2013/0270188 A1 10/2013 Karnik et al.
(Continued)

FOREIGN PATENT DOCUMENTS

JP 2009231810 A 10/2009
JP 2013173660 A 9/2013
(Continued)

OTHER PUBLICATIONS

Wei, et al., Synthesis of N-Doped Graphene by Chemical Vapor Deposition and Its Electrical Properties, Nano Letters 2009; 9(5): 1752-1758, with Supporting Material.*

*Primary Examiner* — Daniel C McCracken
(74) *Attorney, Agent, or Firm* — Sughrue Mion, PLLC

(57) ABSTRACT

Disclosed are a porous graphene member having through-holes formed therein, a method for manufacturing the porous graphene member, and an apparatus for manufacturing the porous graphene member using the method. The method comprises: introducing a carbon source and a substitution reaction source into a deposition furnace; thermally decomposing the carbon source and the substitution reaction source simultaneously to generate carbon atoms and substitution atoms, respectively, wherein the carbon atoms are deposited on a substrate present within the deposition furnace to form a graphene film consisting of a monoatomic layer structure, and during the deposition of carbon atoms, the substitution atoms not only interfere with covalent bonds between the carbon atoms to cause crystal defects, but also substitute for parts of the carbon atoms to in situ form through-holes in the graphene, thereby creating the porous graphene member; and releasing the porous graphene member from the substrate.

7 Claims, 4 Drawing Sheets

(56) References Cited

U.S. PATENT DOCUMENTS

| | | |
|---|---|---|
| 2014/0054505 A1 | 2/2014 | Tse et al. |
| 2014/0120270 A1* | 5/2014 | Tour ........................ C23C 16/26 |
| | | 427/596 |

FOREIGN PATENT DOCUMENTS

| | | |
|---|---|---|
| JP | 2013536077 A | 9/2013 |
| JP | 2014185074 A | 10/2014 |
| JP | 2014241297 A | 12/2014 |
| JP | 2015516286 A | 6/2015 |
| JP | 2015176725 A | 10/2015 |
| KR | 10-1375145 B1 | 3/2014 |
| WO | WO 2015/031841 * 3/2015 ............. C01B 31/04 |

* cited by examiner

POROUS GRAPHENE MEMBER, METHOD FOR MANUFACTURING SAME, AND APPARATUS FOR MANUFACTURING SAME USING THE METHOD

BACKGROUND OF THE INVENTION

1. Field of the Invention

The present disclosure relates to a porous graphene member, to a method for manufacturing the same, and to an apparatus for manufacturing the same. More particularly, the present disclosure pertains to a porous graphene member having a through-hole formed therein, fabricated in such a way that, during the formation of graphene, consisting of a monoatomic layer, a crystal defect is created at the covalent bonds between the carbon atoms of the graphene and an impurity atom substitutes for parts of the carbon atoms, a method for manufacturing the porous graphene member, and an apparatus for manufacturing the porous graphene member using the method.

2. Description of the Related Art

Consisting of a planar monoatomic layer of carbon atoms, graphene in which the technology thereof has seen rapid development in recent years has various advantages: it is far superior in conductivity to copper, it allows for faster electron mobility therein than in silicon, and it has even higher strength than steel. With these properties, graphene finds applications in a wide spectrum of fields including ultra-high speed semiconductors, flexible displays employing transparent electrodes, computer parts, high-efficiency solar cells, etc.

Although having various advantageous, graphene is problematic in that it is difficult to produce graphene on mass scale at low cost because the production of graphene requires many processes, very high temperatures, and expensive equipment.

RELATED ART DOCUMENT

Patent Document (Patent Document 0001) Korean Patent No. 10-1375145, titled "Graphene conductive layer having carbon member, method of manufacturing the same, and optoelectric device, solar cell, and electronic device having the same", (issued Mar. 11, 2014)

SUMMARY OF THE INVENTION

The present disclosure provides a porous graphene member having a through-hole formed therein, fabricated in such a way that, while carbon atoms generated from a carbon source including a carbon precursor by pyrolysis are deposited to form graphene, in an in-situ manner a substitution reaction source (or doping source) is decomposed to supply a substitution atom that artificially causes a crystal defect at the covalent bonds between the carbon atoms of the graphene and substitutes for the crystal defect-caused carbon atom, a method for manufacturing the porous graphene member, and an apparatus for manufacturing the porous graphene member using the method.

An aspect of the present invention provides a method for manufacturing a porous graphene member, comprising: introducing a carbon source and a substitution reaction source into a deposition furnace; thermally decomposing the carbon source and the substitution reaction source simultaneously to generate carbon atoms and substitution atoms, respectively, wherein the carbon atoms are deposited on a substrate present within the deposition furnace to form a graphene film consisting of a monoatomic layer structure, and during the deposition of carbon atoms, the substitution atoms not only interfere with covalent bonds between the carbon atoms to cause crystal defects, but also substitute for parts of the carbon atoms to in situ form through-holes in the graphene, thereby creating the porous graphene member; and releasing the porous graphene member from the substrate.

In some embodiments of the present disclosure, the substrate comprises at least one selected from among a copper plate and a copper-plated plate, both of which can prevent the monoatomic carbon layer from being thermally deformed and can allow the porous graphene member to be easily released therefrom.

In some embodiments of the present disclosure, the method further comprises separately vaporizing the carbon source and the substitution reaction source at same time prior to introducing the carbon source and the substitution reaction source into the deposition furnace wherein the vaporized carbon source and the vaporized substitution reaction source are transmitted into the deposition furnace by a carrier gas.

In some embodiments of the present disclosure, the carbon source contains a carbon precursor including a hydrocarbon and the substitution reaction source contains a nitrogen precursor including a nitrogen compound.

In some embodiments of the present disclosure, the carbon source and the substitution reaction source are introduced into the deposition furnace via respective pipes.

In some embodiments of the present disclosure, the carbon source and the substitution reaction source are introduced into the deposition furnace through a common pipe where the carbon source and the substitution reaction source are mixed.

In some embodiments of the present disclosure, the substitution reaction source comprises at least one selected from the group consisting of ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide (($CH_3)_2NCHO$), lithium nitride ($Li_3N$) and cyanuric chloride ($C_3Cl_3N_3$).

In some embodiments of the present disclosure, the carbon source contains at least one selected from the group consisting of methane ($CH_4$), methanol ($CH_3OH$), carbon monoxide (CO), ethane ($C_2H_6$), ethylene ($C_2H_4$), ethanol ($C_2H_5OH$) acetylene ($C_2H_2$), acetone ($CH_3COCH_3$), propane ($C_3H_8$), propylene ($C_3H_6$), butane ($C_4H_{10}$), pentane ($C_5H_{12}$), pentene ($C_5H_{10}$), cyclopentadiene ($C_6H_6$), hexane ($C_6H_{14}$), cyclohexane ($C_6H_{12}$), benzene ($C_6H_6$), toluene ($C_7H_8$), and xylene ($C_8H_{10}$).

Another aspect of the present disclosure provides an apparatus for manufacturing a porous graphene member, comprising: a material feeder comprising a first material feeder for providing a carbon source and a second material feeder for providing a substitution reaction source; a simultaneous vaporizer comprising a first vaporizer for vaporizing the carbon source and a second vaporizer for vaporizing the substitution reaction source; and a deposition furnace in which the carbon source fed from the first vaporizer and the substitution reaction source fed from the second vaporizer are simultaneously decomposed to generate carbon atoms and substitution atoms, respectively, wherein the carbon atoms are deposited on a substrate present within the deposition furnace to form a graphene film consisting of a monoatomic layer structure, and during the deposition of carbon atoms, the substitution atoms not only interfere with covalent bonds between the carbon atoms to cause crystal defects, but also substitute for parts of the carbon atoms to in situ form through-holes in the graphene, thereby creating the porous graphene member.

In some embodiments of the present disclosure, the substrate present in the deposition furnace comprises a metallic plate from which the porous graphene member can be released.

In some embodiments of the present disclosure, the apparatus further comprises a first pipe through which the first vaporizer communicates with the deposition furnace, and a second pipe through which the second vaporizer communicates with the deposition furnace, each of the first pipe and the second pipe being associated with a heating unit to heat the vaporized carbon source or the vaporized substitution source.

In some embodiments of the present disclosure, the apparatus further comprises a common pipe that is connected to the deposition furnace and into which both the first pipe connected to the first vaporizer and the second pipe connected to the second vaporizer are convergent.

In some embodiments of the present disclosure, the carbon source fed from the first material feeder comprises at least one selected from the group consisting of methane ($CH_4$), methanol ($CH_3OH$), carbon monoxide (CO), ethane ($C_2H_6$), ethylene ($C_2H_4$), ethanol ($C_2H_5OH$), acetylene ($C_2H_2$), acetone ($CH_3COCH_3$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$), and xylene ($C_8H_{10}$).

In some embodiments of the present disclosure, the substitution reaction source fed from the second material feeder comprises at least one selected from the group consisting of ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide (($CH_3)_2NCHO$), lithium nitride ($Li_3N$), and cyanuric chloride ($C_3Cl_3N_3$).

In some embodiments of the present disclosure, the apparatus further comprises a carrier gas supply for transmitting into the deposition furnace the first carbon source and substitution reaction source that are vaporized in the first vaporizer and the second vaporizer, respectively.

In some embodiments of the present disclosure, the deposition furnace further comprises an atomic layer deposition (ALD) device for use in forming the monoatomic layer of carbon on the substrate.

In some embodiments of the present disclosure, the first vaporizer comprises a first heating furnace for providing heat to vaporize the carbon source, and the second vaporizer comprises a second heating furnace for providing heat to vaporize the substitution reaction source.

A further aspect of the present disclosure provides a porous graphene member having through-holes therein, wherein the through-holes are in situ formed as substitution atoms not only interfere with covalent bonds between the carbon atoms to cause crystal defects, but also substitute for parts of the carbon atoms to form through-holes in the graphene during the deposition of carbon atoms.

According to the present disclosure, a porous graphene member having a through-hole formed therein can be fabricated in such a way that, while carbon atoms generated from a carbon source including a carbon precursor by pyrolysis are deposited to form graphene, a substitution reaction source is decomposed to supply a substitution atom that interferes with covalent bonds between carbon atoms to cause crystal defects and substitutes for parts of the carbon atoms, thereby in situ forming the through-holes in the graphene. Thus, the porous graphene member can be manufactured using a simple process and apparatus.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
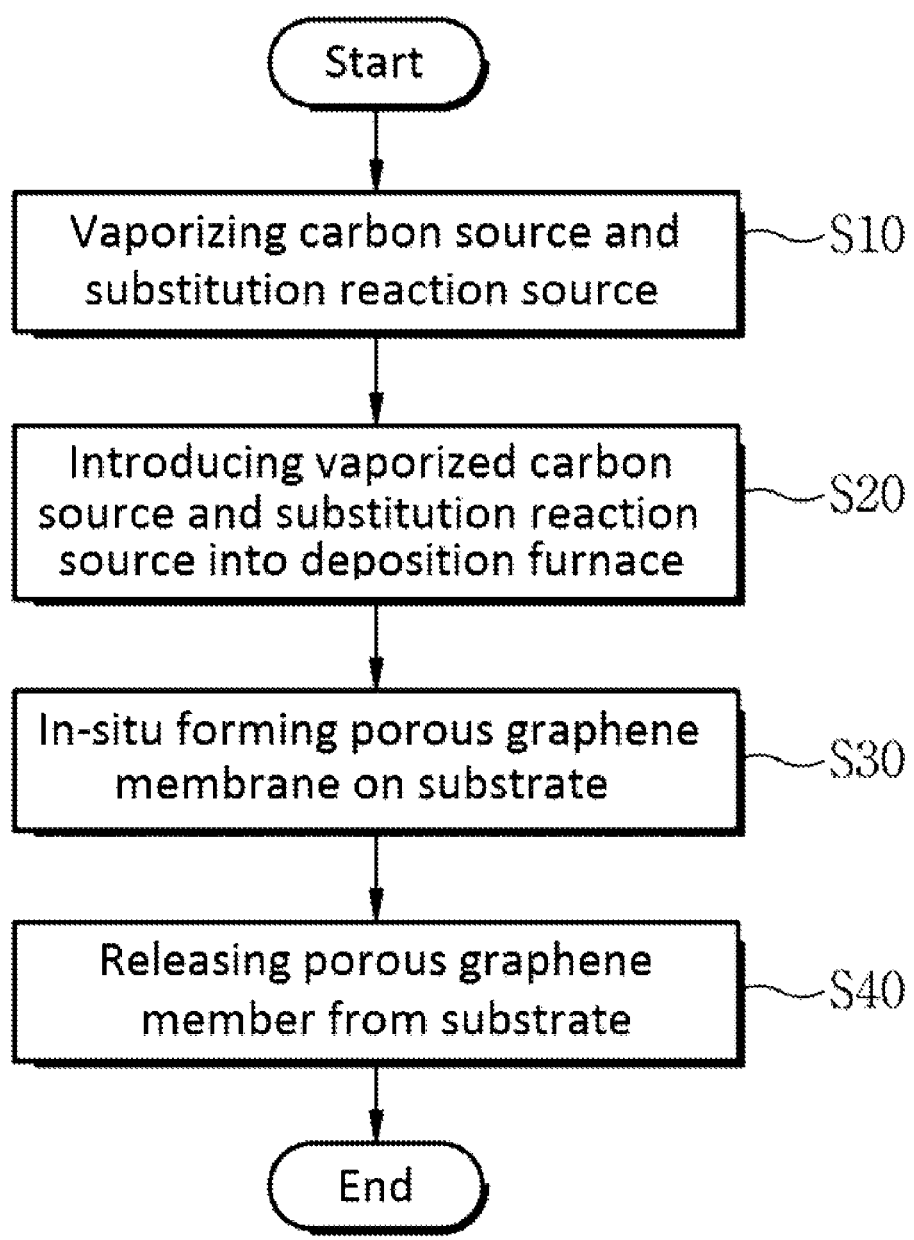
FIG. 1 is a flow chart of illustrating a method for manufacturing a porous graphene member in accordance with some embodiments of the present disclosure.

Reference now should be made to the drawings, throughout which the same reference numerals are used to designate the same or similar components. Below, a description will be given of preferred embodiments of the present invention in conjunction with the accompanying drawings. Throughout the accompanying drawings, the same reference numerals are used to designate the same or similar components. In the following description of the present invention, when it is determined that the detailed description of the related art would obscure the gist of the present invention the description thereof will be omitted.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention.

The technical term "graphene", as frequently used herein, refers to a monoatomic layer structure of carbon having a hexagonal ring as a fundamental repeat unit in which one atom forms each vertex. In the present disclosure, however, a monoatomic layer structure in which five or seven carbon atoms covalently bonded together as a basic repeat unit is also defined as "graphene".

In the context of the present invention, a multi-atomic layer structure in which carbon atoms are layered on the top of each other has difficulty in achieving the purpose of the present disclosure, and is excluded from the scope of "graphene".

The technical term "crystal defect", as frequently used in connection with graphene, is defined as the break of at least one of the covalent bonds formed between some carbon atoms of graphene with the aim of substituting a nitrogen atom for the carbon atom.

Figure 2:
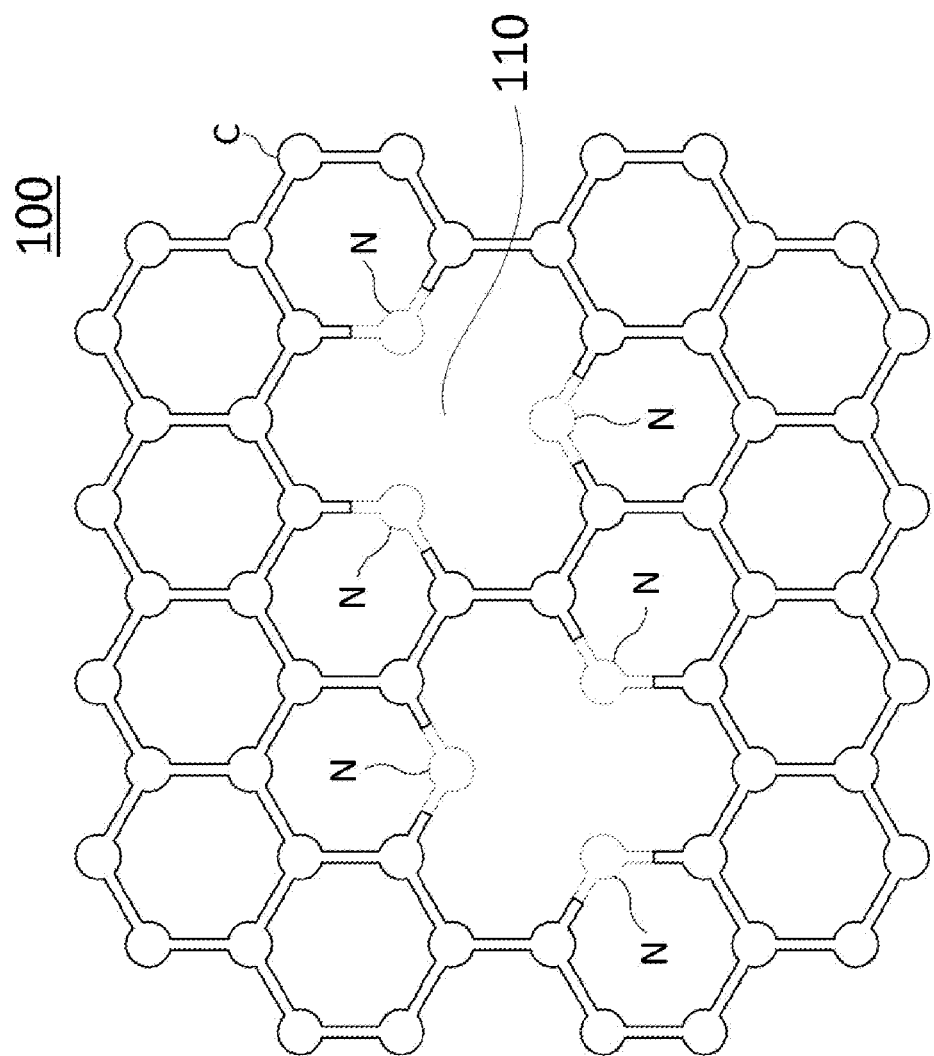
FIG. 2 is a plane view of the porous graphene member manufactured by the method described in FIG. 1.

FIG. 1 is a flow chart of illustrating a method for manufacturing a porous graphene member in accordance with some embodiments of the present disclosure. FIG. 2 is a plane view of the first graphene member manufactured by the method illustrated in FIG. 1.

With reference to FIGS. 1 and 2, the manufacture of a porous graphene member 100 starting with simultaneously vaporizing a liquid or gaseous carbon source for use in the fabrication of graphene and a substitution reaction source (or doping source) for use in the formation of pores in the graphene (step S10).

In step S10, the carbon source may comprise a carbon precursor that can be thermally decomposed into carbon and hydrogen atoms while the substitution reaction source may contain, for example, a nitrogen precursor that can cause a crystal defect at the covalent bonds between the carbon atoms and substitute for parts of the carbon atoms participating in the formation of graphene.

The vaporization of the carbon precursor contained in the carbon source and the nitrogen precursor contained in the nitrogen source is applied when the carbon precursor and the nitrogen precursor are in a liquid phase, and step S10 may be omitted for gaseous phase.

While forming covalent bonds with each other, carbon atoms (C) generated from a carbon precursor of a carbon source are deposited on a substrate to form a monoatomic layer. The carbon precursor may comprise a gaseous or liquid phase hydrocarbon that can be thermally decomposed into carbon and hydrogen atoms.

According to particular embodiments of the present disclosure, materials available as the carbon source may be hydrocarbons, which can be thermally decomposed into carbon atoms and hydrogen atoms, as exemplified by methane ($CH_4$), ethane ($C_2H_6$), ethylene ($C_2H_4$), acetylene ($C_2H_2$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$), and xylene ($C_8H_{10}$). Other examples include methanol ($CH_3OH$), carbon monoxide (CO), ethanol ($C_2H_5OH$), and acetone ($CH_3COCH_3$), which can also produce carbon and hydrogen atoms by pyrolysis.

So long as it can be decomposed into carbon and hydrogen atoms by pyrolysis, any hydrocarbon may be used as a carbon precursor for use in the formation of graphene in the present disclosure.

In step S10, nitrogen atoms generated from a nitrogen precursor of a substitution source cause a crystal defect by breaking covalent bonds between carbon atoms consisting of the graphene and substitute for the crystal defect-caused carbon atoms.

Briefly, the carbon atoms at a crystal defect are departed from the graphene while nitrogen atoms from a nitrogen compound of a nitrogen source occupy the positions of the carbon atoms, thus multiple through-holes 110 are formed as shown in FIG. 2.

The nitrogen precursor that serves as a substitution reaction source in forming through-holes 110 in the graphene may be in a gaseous or liquid phase.

Examples of the nitrogen precursor available as the substitution reaction source include ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide (($CH_3)_2NCHO$), lithium nitride ($Li_3N$), and cyanuric chloride ($C_3Cl_3N_3$), with most preference for pyridine. The through-holes 110 formed across the graphene are created as parts of the carbon atoms of the graphene are substituted by pyridinic or pyrrolic nitrogen atoms. Substitution with graphitic nitrogen atoms does not induce the formation of through-holes 110. When pyridine is used as a nitrogen precursor, only pyridinic and pyrrolic nitrogen atoms are generated in the crystal defect-caused graphene, irrespective of doping concentration, without the formation of graphitic nitrogen atoms. Accordingly, pyridine is more advantageous for the formation of through-holes across the graphene than other nitrogen precursors.

In some embodiments of the present disclosure, a liquid nitrogen compound as a nitrogen precursor is vaporized in step S10, but step S10 is omitted for a gaseous phase of the nitrogen precursor.

Although a nitrogen precursor is described as a substitution reaction source in the foregoing, a substitution reaction source containing various substitution atoms may be used to form through-holes of various sizes in the graphene.

With reference to FIG. 1, a nitrogen precursor and a carbon precursor that act as substitution and carbon sources, respectively, may be vaporized in a simultaneous manner in separate vessels if they are in a liquid phase.

Simultaneous vaporization of the nitrogen precursor and the carbon precursor in respective vessels allows for the mass production of quality porous graphene members in an in-situ manner within a short time with ease.

Both the nitrogen precursor and the carbon precursor are introduced into a deposition furnace providing a process space and condition where a porous graphene member is formed (step S20).

To facilitate the introduction of both the nitrogen precursor and the carbon precursor into the deposition furnace, a carrier gas may be used in mixture with each of the precursors.

In some embodiments of the present embodiments, the carrier gas for transmitting the nitrogen precursor and the carbon precursor may be an inert gas such as nitrogen, argon, and the like.

As both the nitrogen precursor and the carbon precursor are introduced into a deposition furnace providing a proper process condition, carbon atoms generated by the pyrolysis of the carbon precursor are deposited onto a substrate to form graphene while the nitrogen atoms generated by the pyrolysis of the nitrogen precursor interfere with covalent bonds between the carbon atoms to cause crystal defects in the graphene.

Occupation of the carbon positions at the crystal defect by nitrogen atoms, which are substitution reaction atoms, allows for the fabrication of a porous graphene member 100 having a plurality of through-holes (or pores) in a monoatomic layer structure on the substrate (step S30).

The process of fabricating a porous graphene member in a deposition furnace using a carbon precursor and a nitrogen precursor may be conducted by chemical vapor deposition (CVD), thermal chemical vapor deposition (TCVD), rapid thermal chemical vapor deposition (RTCVD), inductive coupled plasma chemical vapor deposition (ICP-CVD), or atomic layer deposition (ALD).

Preferred in some embodiments of the present disclosure is atomic layer deposition because the graphene is formed as a monoatomic layer on a substrate.

After being formed on a substrate in a deposition furnace, the porous graphene member 100 in a film form is released from the substrate.

In some embodiments of the present disclosure, the substrate arranged within the deposition furnace is preferably a copper plate or a copper-plated plate because it is unlikely for the porous graphene member 100 to be attached thereto and thus allows the porous graphene member 100 to be readily released from the substrate.

In particular embodiments of the present disclosure, the density of through-holes 110 in the porous graphene member 100 formed on a substrate arranged within a deposition furnace, can be adjusted by the ratio (concentration) between the nitrogen and carbon precursors supplied to the deposition furnace.

For instance, an increase in the level (concentration) of the nitrogen precursor relative to the carbon precursor increases the density of through-holes 110 in the porous graphene member 100. On the other hand, a decrease in the level (concentration) of the nitrogen precursor relative to the carbon precursor decreases the density of through-holes 110 in the porous graphene member 100. Particularly in the case where respective vaporants from a liquid carbon precursor and a liquid nitrogen precursor are simultaneously introduced into a deposition furnace, it is easy to adjust the ratio of the nitrogen precursor to the carbon nitrogen, thus simply controlling the density of through-holes in the graphene member.

Figure 3:
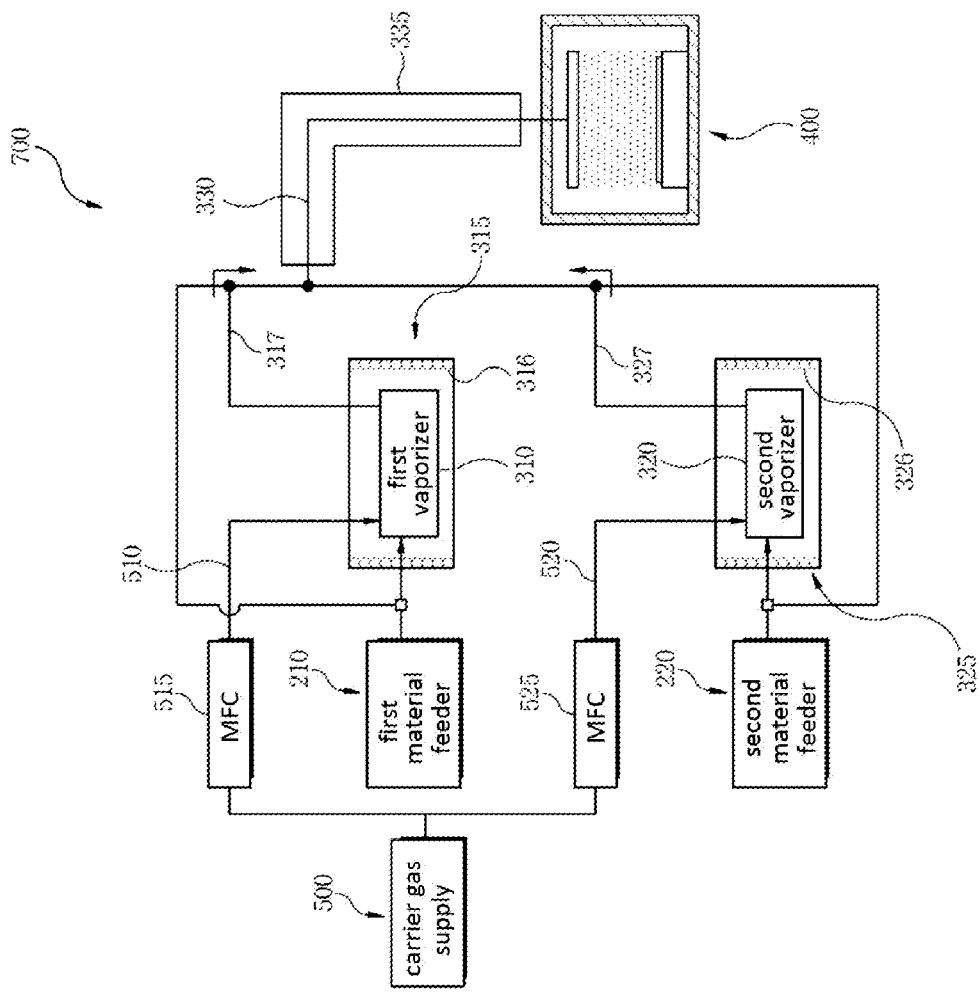
FIG. 3 is a block diagram illustrating an apparatus for manufacturing a porous graphene member in accordance with some embodiments of the present disclosure.

FIG. 3 is a block diagram illustrating an apparatus 700 for manufacturing a porous graphene member in accordance with some embodiments of the present disclosure.

With reference to FIGS. 2 and 3, the apparatus 700 for manufacturing a porous graphene member comprises a material feeder, a simultaneous vaporizer and a deposition furnace 400. In addition, the apparatus 700 for manufacturing a porous graphene member may further comprise a carrier gas supply 500.

The material feeder may comprise a first material feeder 210 and a second material feeder 220.

The simultaneous vaporizer may comprise a first vaporizer 310 and a second vaporizer 320.

By the first material feeder 210, a carbon source for use in the formation of graphene is fed into the first vaporizer 310 of the simultaneous vaporizer as described later.

The carbon source that is fed from the first material feeder 210 to the first vaporizer 310 may be a carbon precursor including a hydrocarbon.

The carbon precursor fed from the first material feeder 210 may be a hydrocarbon, which can be thermally decomposed into carbon atoms and hydrogen atoms, as exemplified by methane ($CH_4$), ethane ($C_2H_6$), ethylene ($C_2H_4$), acetylene ($C_2H_2$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$), and xylene ($C_8H_{10}$). Other examples include methanol ($CH_3OH$), carbon monoxide (CO), ethanol ($C_2H_5OH$), and acetone ($CH_3COCH_3$), which can also produce carbon and hydrogen atoms by pyrolysis.

In some embodiments of the present disclosure, the carbon precursor may be stored as a gas phase in the first material feeder 210. In this case, the carbon precursor may be directly supplied into the deposition furnace 400 with the bypass of the simultaneous vaporizer.

The second material feeder 220 acts to supply a substitution reaction source into a second vaporizer 320 of the simultaneous vaporizer.

The substitution reaction source supplied from the second material feeder 220 to the second vaporizer 320 may be a nitrogen precursor including a nitrogen compound.

Examples of the nitrogen precursor available as the substitution source that is to be supplied from the second material feeder 220 include: ammonia ($NH_3$), hydrazine ($N_2H_4$), pyridine ($C_5H_5N$), pyrrole ($C_4H_5N$), acetonitrile ($CH_3CN$), nitric acid ($HNO_3$), silver nitrate ($AgNO_3$), barium nitrate ($Ba(NO_3)_2$), N,N-dimethylformamide (($CH_3)_2NCHO$, lithium nitride ($Li_3N$), and cyanuric chloride ($C_3Cl_3N_3$).

In some embodiments of the present disclosure, when the nitrogen precursor is fed as a gas phase from the second material feeder 220, it may be transmitted directly to the deposition furnace 400, with the bypass of the simultaneous vaporizer.

In some embodiments of the present disclosure, each of the first and the second material feeders 210 and 220 may be provided with an electric valve or a mass flow controller (MFC) for controlling the flow rates of the carbon source and the substitution reaction source.

As described in the foregoing, the simultaneous vaporizer comprises the first vaporizer 310 and the second vaporizer 320.

Communicating with the first material feeder 210, the first vaporizer 310 may be fed with the carbon source, that is, a carbon precursor, from the first material feeder 210.

The first vaporizer 310 comprises a container that is provided with an inlet through which a carbon precursor to be vaporized is introduced into the container and with an outlet through which a vaporized carbon precursor is released from the container. The inlet communicates with the first material feeder 210 while the outlet is connected with the deposition furnace 400 as will be described later.

In order to thermally vaporize the carbon precursor supplied to the first vaporizer 310, a first heating furnace 315 may be provided outside the first vaporizer 310 while a heating wire 316 for generating heat may be arranged inside the first heating furnace 315. Various heat generating devices other than the heating wire 316 may be provided for the first heating furnace 315.

The second vaporizer 320 communicates with the second material feeder 220 and is supplied with a substitution source, e.g., a nitrogen precursor, from the second material feeder 220.

The second vaporizer 320 comprises a container that is provided with an inlet through which a nitrogen precursor to be vaporized is introduced into the container and with an outlet through which a vaporized nitrogen precursor is released from the container. The inlet communicates with the second material feeder 220 while the outlet is connected with the deposition furnace 400 as will be described later.

For use in thermally vaporizing the nitrogen precursor supplied to the second vaporizer 320, a second heating furnace 325 may be provided outside the second vaporizer 320 while a heating wire 326 for generating heat may be arranged inside the second heating furnace 325. Various heat generating devices other than the heating wire 326 may be provided for the first heating furnace 325.

Although the use of the first and second heating furnaces 315 and 325 comprising the heating wires 316 and 326 is described in the foregoing to vaporize the carbon and nitrogen precursors supplied to the respective first and second vaporizers 310 and 320, the carbon and the nitrogen precursor may be chemically vaporized by providing a reactive gas.

Meanwhile, the carrier gas supply 500 for supplying carrier gas communicates with both the first vaporizer 310 and the second vaporizer 320 so that the carrier gas transmits the carbon precursor and the nitrogen precursor respectively vaporized in the first vaporizer 310 and the second vaporizer 320 to the deposition furnace 400.

After being supplied from the carrier gas supply 500 to the first vaporizer 310 and the second vaporizer 320, inert gas, such as nitrogen, argon, etc., transmits the carbon precursor and the nitrogen precursor vaporized respectively in the first vaporizer 310 and the second vaporizer 320 into the deposition furnace 400.

In some embodiments of the present disclosure, the carrier gas supply 500 is connected with the first vaporizer 310 and the second vaporizer 320 via inert gas supplying pipes 510 and 520, respectively. The inert gas-supplying pipes 510 and 520 may be conjugated with respective mass flow controllers (MFC) 515 and 525.

Turning to FIG. 3, the outlet of the first vaporizer 310 through which the carbon precursor vaporized in the first vaporizer 310 is released is connected with a first pipe 317 while the outlet of the second vaporizer 320 through which the nitrogen precursor vaporized in the second precursor 320 is released is connected with a second pipe 327.

Both the first pipe 317 and the second pipe 318 are convergent into a common pipe 330 that communicates with the deposition furnace 400.

The vaporized carbon precursor and the nitrogen precursor are transmitted through the first pipe 317 and the second pipe 327, respectively, and are mixed together in the common pipe 330 before entering the deposition furnace 400. Thus, the vaporized carbon and nitrogen precursors proceed in the form of a uniform mixture towards the deposition furnace 400.

In some embodiments of the present disclosure, the common pipe 330 may be equipped with a heating unit 335 so that the vaporized carbon and nitrogen precursors traveling through the common pipe 330 respectively from the first pipe 317 and the second pipe 327 are prevented from being liquefied or deposited onto inside walls of the first and the second pipes 317 and 327.

The heating unit 335 may comprise, for example, a heating wire that can generate heat with the consumption of electric energy. The heating unit 335 heats the common pipe 330 to minimize the temperature change of the vaporized carbon and nitrogen precursors.

In some embodiments of the present disclosure, the heating unit 335, although described to be mounted onto the common pipe 330 where the vaporized carbon and nitrogen precursors are mixed in the foregoing, may be further provided for each of the first pipe 317 and the second pipe 327.

Figure 4:
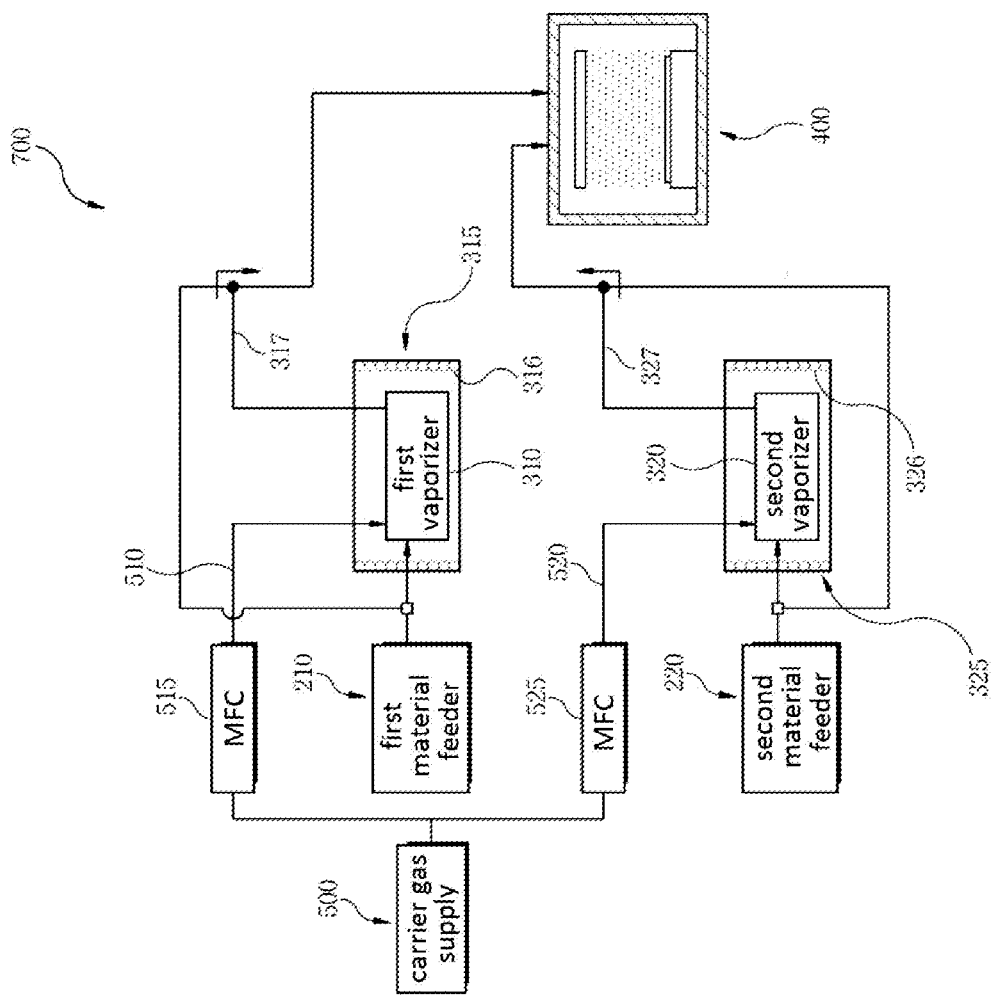
FIG. 4 is a block diagram illustrating an apparatus for manufacturing a porous graphene member according to some embodiments of the present disclosure.

As shown in FIG. 3, both the vaporized carbon and nitrogen precursors that are respectively provided through the first pipe 317 and the second pipe 327 travel, together, through the common pipe 330 in some embodiments of the present disclosure. In alternative embodiments, as shown in FIG. 4, the vaporized carbon and nitrogen precursors may proceed toward the deposition furnace 400 through the first pipe 317 and the second pipe 327, respectively, without the common pipe 330.

When the nitrogen and carbon precursors are separately introduced into the deposition furnace 400 without the common pipe 330, a shower head may be preferably provided for mixing and injecting the nitrogen and carbon precursors.

Turning again to FIG. 3, the deposition furnace 400 serves to establish a process condition and atmosphere under which the porous graphene member 100 shown in FIG. 2 is fabricated with the carbon precursor supplied from the first vaporizer 310 through the first pipe 317 and the common pipe 330, and with the nitrogen precursor supplied from the second vaporizer 320 through the second pipe 327 and the common pipe 330.

The deposition furnace 400 establishing a process condition and atmosphere for forming the porous graphene member may be selected from the group consisting of chemical vapor deposition equipment, thermal chemical vapor deposition equipment, rapid thermal chemical vapor deposition equipment, inductive coupled plasma chemical vapor deposition equipment, and atomic layer deposition equipment.

Since a monoatomic layer is formed on a substrate disposed in the deposition furnace 400, atomic layer deposition (ALD) may be employed in some embodiments of the present disclosure.

The substrate, disposed within the deposition furnace 400, onto which the porous graphene member is deposited, may be made of, for example, a metallic material that allows the porous graphene member to be easily separated from the substrate and which is unlikely to undergo deformation at a high temperature. In some embodiments of the present disclosure, the metallic substrate disposed in the deposition furnace 400 may include a copper plate or a copper-plated plate.

Although the substrate, disposed in the deposition furnace 400 and on which the porous graphene member is deposited, is described to be a copper plate or copper-plated plate in the foregoing, various metallic substrates may employed as long as they allow the porous graphene member to be easily released from the substrates.

Below, a description will be given of the action of the apparatus for manufacturing a porous graphene member.

First, a carbon precursor in a liquid phase is supplied from the first material feeder 210 to the first vaporizer 310 where the carbon precursor is vaporized by the heat from the first heating furnace 315.

Simultaneously, a nitrogen precursor in a liquid phase is supplied from the second material feeder 330 to the second vaporizer 320 where the nitrogen precursor is vaporized by the heat from the second heating furnace 325.

The carbon precursor vaporized in the first vaporizer 310 and the nitrogen precursor vaporized in the second vaporizer 320 are transmitted through the first pipe 317 and the second pipe 327, respectively, and are mixed together in the common pipe 330 before entering the deposition furnace 400.

In the deposition furnace, the vaporized carbon source is thermally decomposed into carbon atoms and hydrogen atoms. The hydrogen atoms are released outside the deposition furnace while the carbon atoms are deposited on a substrate by, for example, atomic layer deposition to form graphene, which is a monoatomic layer structure.

During the formation of carbon atoms into graphene in the deposition furnace, the nitrogen source that is introduced, together with the carbon precursor, into the deposition furnace is decomposed to generate nitrogen atoms that, in turn, react with the covalent bonds between the carbon atoms to cause a crystal defect and then bond to carbon atoms in place of the carbon atoms of the crystal defect.

With the substitution of the nitrogen atoms for the carbon atoms of the crystal defect, a porous graphene member 100 in which through-holes 110 is formed is fabricated as shown in FIG. 2.

After being fabricated on the substrate in the deposition furnace 400, a porous graphene member having through-holes formed therein is released from the substrate.

In accordance with some embodiments of the present disclosure, the porous graphene member may find applications in various fields including the selective filtration of a specific gas, such as carbon dioxide, from air, particular matters from vehicle emissions, impurities from water as in water purifiers, and impurities or particular materials from blood as in medical filters.

As elucidated hitherto, the porous graphene member having a through-hole formed therein according to the present disclosure can be fabricated in such a way that, while carbon atoms generated from a carbon source including a carbon precursor by pyrolysis are deposited to form graphene, a substitution reaction source is decomposed to supply a substitution atom that causes a crystal defect in the graphene and substitutes for parts of the carbon atoms, thereby in situ forming the through-hole in the graphene. Thus, the porous graphene member can be manufactured using a simple process and apparatus.

Embodiments illustrated in the drawings are set forth to illustrate, but are not to be construed as limiting the present invention. It should be apparent to those skilled in the art that although many specified elements such as concrete components are elucidated in the following description, they are intended to aid the general understanding of the invention and the present invention can be implemented without the specified elements.

What is claimed is:

1. A method for manufacturing a porous graphene member, comprising:
   introducing a carbon source and a substitution reaction source comprising pyridine($C_5H_5N$) as a nitrogen precursor for forming through-holes in graphene into a deposition furnace;
   thermally decomposing the carbon source and the substitution reaction source simultaneously to generate carbon atoms and substitution atoms, respectively, wherein the carbon atoms are deposited on a substrate present within the deposition furnace to form a graphene film consisting of a monoatomic layer structure, and during the deposition of carbon atoms, the substitution atoms not only interfere with covalent bonds between the carbon atoms to cause crystal defects, but also substitute for parts of the carbon atoms to in situ form through-holes in the graphene, thereby creating the porous graphene member; and
   releasing the porous graphene member from the substrate.

2. The method of claim 1, wherein the substrate comprises at least one selected from among a copper plate and a copper-plated plate, both of which can prevent the monoatomic carbon layer from being thermally deformed and can allow the porous graphene member to be easily released therefrom.

3. The method of claim 1, wherein the method further comprises separately vaporizing the carbon source and the substitution reaction source at same time prior to introducing the carbon source and the substitution reaction source into the deposition furnace wherein the vaporized carbon source and the vaporized substitution reaction source are transmitted into the deposition furnace by a carrier gas.

4. The method of claim 3, wherein the carbon source contains a carbon precursor including a hydrocarbon and the substitution reaction source contains a nitrogen precursor including a nitrogen compound.

5. The method of claim 1, wherein the carbon source and the substitution reaction source are introduced into the deposition furnace via respective pipes.

6. The method of claim 1, wherein the carbon source and the substitution reaction source are introduced into the deposition furnace through a common pipe where the carbon source and the substitution reaction source are mixed.

7. The method of claim 1, wherein the carbon source contains at least one selected from the group consisting of methane ($CH_4$), methanol ($CH_3OH$), carbon monoxide (CO), ethane ($C_2H_6$), ethylene ($C_2H_4$), ethanol ($C_2H_5OH$), acetylene ($C_2H_2$), acetone ($CH_3COCH_3$), propane ($C_3H_8$), propylene ($C_3H_6$), butane ($C_4H_{10}$), pentane ($C_5H_{12}$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$), and xylene ($C_8H_{10}$).

* * * * *